ALEXANDER E. MARTENS
*INVENTOR.*

BY Charles C. Krawczyk

*ATTORNEY*

ALEXANDER E. MARTENS
INVENTOR.

BY Charles C. Krawczyk

ATTORNEY

United States Patent Office 3,465,157
Patented Sept. 2, 1969

3,465,157
TEMPERATURE COMPENSATING CIRCUITS FOR PHOTOELECTRIC DEVICES
Alexander E. Martens, Greece, N.Y., assignor to Bausch & Lomb Incorporated, Rochester, N.Y., a corporation of New York
Continuation-in-part of application Ser. No. 643,661, June 5, 1967. This application Oct. 19, 1967, Ser. No. 676,452
Int. Cl. H01j 39/12
U.S. Cl. 250—207                    14 Claims

ABSTRACT OF THE DISCLOSURE

A temperature compensating circuit, including a temperature sensitive element mounted near the electrodes of a photoelectric device to sense its operating temperature, is coupled to an electrode of the device to stabilize its operation. The temperature compensating circuit includes two variable resistors for matching the temperature compensating action of the circuit to the characteristics of the connected photoelectric device.

FIELD OF THE INVENTION

This invention relates to temperature compensating circuits for stabilizing the operation of photoelectric devices.

CROSS REFERENCES TO RELATED APPLICATIONS

This application is a continuation-in-part of a copending application, Ser. No. 643,661, filed June 5, 1967, for Alexander E. Martens, the inventor of the present application and assigned to the assignee of the present application.

SUMMARY OF THE INVENTION

The temperature compensating circuit of the invention exhibits a temperature responsive impedance that can be adjusted to correspond to the temperature vs. sensitivity characteristics of a photoelectric device. The temperature compensating circuit is coupled to the photoelectric device in a manner to maintain the sensitivity of the device substantially constant over the normal operating range of the device.

In first and second embodiments of the temperature compensating circuits of the invention, the circuits are connected to control the potential on a control electrode of the photoelectric device. In the first embodiment the temperature sensitive element is connected as a leg of a variable bridge circuit. In the second embodiment of the invention the temperature sensitive element is connected in series and parallel with adjustable impedances.

In third and fourth embodiments of the temperature compensating circuit of the invention, the circuits are connected to control the potential on an electron collecting electrode of the photoelectric device. In the third embodiment of the invention the temperature sensitive element is connected in series and parallel with adjustable impedances. In the fourth embodiment of the invention the temperature sensitive element is connected as a portion of a direct current variable gain amplifier circuit.

In each of the embodiment, the variable impedances are adjusted to match the operation of the temperature compensating circuit to compensate for the temperature variation of the connected photoelectric device.

A further feature of the invention includes the location of the temperature sensitive element adjacent the electrodes of the photoelectric device for maximum sensitivity.

DESCRIPTION OF THE PREFERRED EMBODIMENTS

It is well-known that the sensitivity of photoelectric devices, such as photomultiplier tubes and photoelectric field-effect transistors, decreases with increasing temperatures. This is particularly troublesome when long term stability is required of circuits employing such photoelectric devices. Since the temperature dependent drift of photoelectric field-effect transistors and photomultiplier tubes varies widely between individual devices, it is extremely difficult to predict the exact temperature compensation that must be applied thereto. Accordingly, a temperature compensating circuit should incorporate means for matching the characteristics of the circuit to that of the particular photoelectric device employed.

Until the present invention, no known temperature compensation circuits were available that effectively stabilized the operation of a photomultiplier tube over its normal expected range of operating temperatures. Various noted authorities contended that such photomultiplier tubes could not be successfully temperature compensated. As a result, most schemes employed automatic gain control feedback systems to minimize the temperature instabilities. In many cases such techniques are not readily adaptable, and are often too expensive.

One of the key problems of a temperature compensating circuit is the location of the temperature sensitive element for efficient monitoring of the operating temperature of the photoelectric device. The temperature sensitive element should be located in a position that it can rapidly and accurately sense the changes in operating conditions with a minimum delay. It has been found that the temperature about the base pins of a photomultiplier (illustrated in FIGURES 2 and 3), provides an excellent indication of the operating temperature of the tube. Furthermore, it has been found that the temperature about the base pins also follows changes in the operating conditions of the tube with a minimum of delay.

Figure 1:
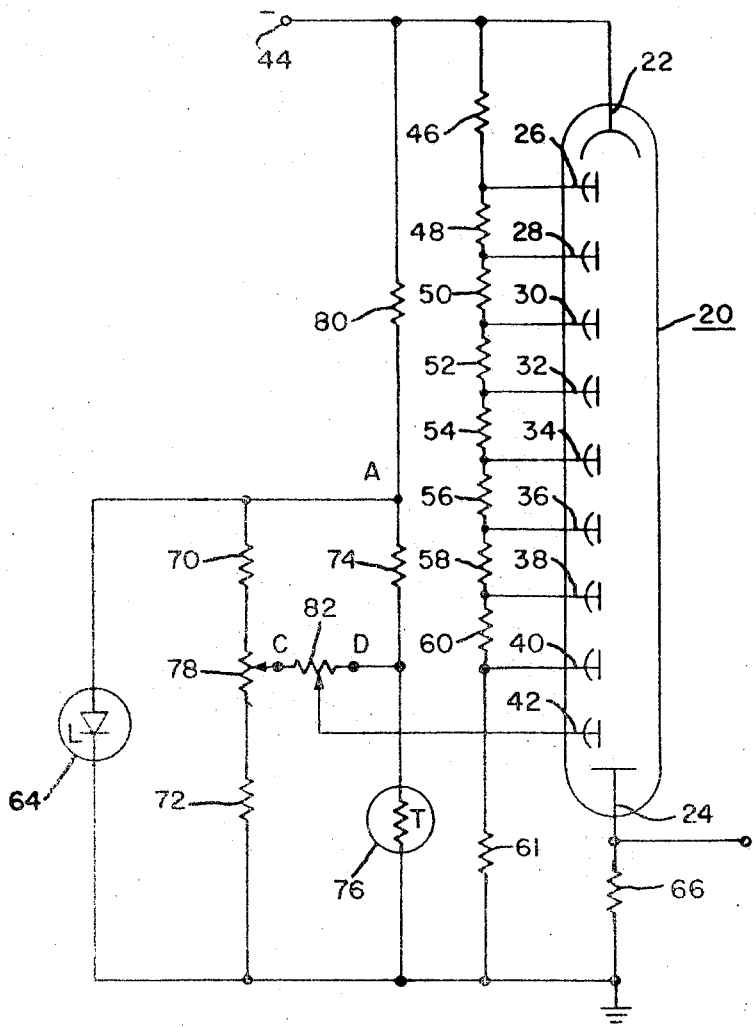
FIGURE 1 is an electrical schematic diagram of the photomultiplier tube circuit including a first embodiment of the temperature compensating circuit of the invention coupled to a dynode electrode of the photomultiplier tube.

In FIGURE 1, the operation of a photomultiplier tube 20 is stabilized by a temperature sensitive bridge circuit. The photomultiplier tube includes a photocathode 22 (electron emitting element in response to radiation applied thereto) a plurality of dynodes 26–42 (current amplifying electrodes) and an anode 24 (current collecting electrode). A source of energizing potential (not shown) is adapted to be connected between a power supply terminal 44 and ground. The photocathode 22 is directly connected to the terminal 44. The biasing circuit for the dynodes 26–40 comprises a voltage divider circuit including the resistors 46–61 connected in a series circuit between the power supply terminal 44 and ground. The dynodes 26–40 are connected to the voltage divider circuit so that the dynode 26 receives the highest biasing potential (with respect to ground) and the following dynodes 28–40 receive successively lower biasing potentials. The anode 24 is connected to ground through a resistor 66.

A temperature compensating control signal developed by the temperature compensating bridge circuit of FIGURE 1 is applied to the last dynode 42. The temperature compensating bridge circuit includes three resistors 70, 72, and 74 forming three legs of the bridge circuit and a temperature sensitive element 76, such as a thermistor, forming the fourth leg. A potentiometer 78 is coupled between the bridge circuit legs including the resistors 70 and 72. The bridge circuit is connected at one end to ground and at the other end through a resistor 80 to the power supply terminal 44. A Zener diode 64 is connected across the bridge circuit to stabilize the energizing potential applied to the bridge circuit.

One end of a potentiometer 82 is connected to the movable arm or wiper of the potentiometer 78 and the other end to the junction of the resistor 74 and the thermistor 76. The wiper of the potentiometer 82 is connected to the dynode 42 for applying a temperature compensating control voltage thereto.

Figure 2:
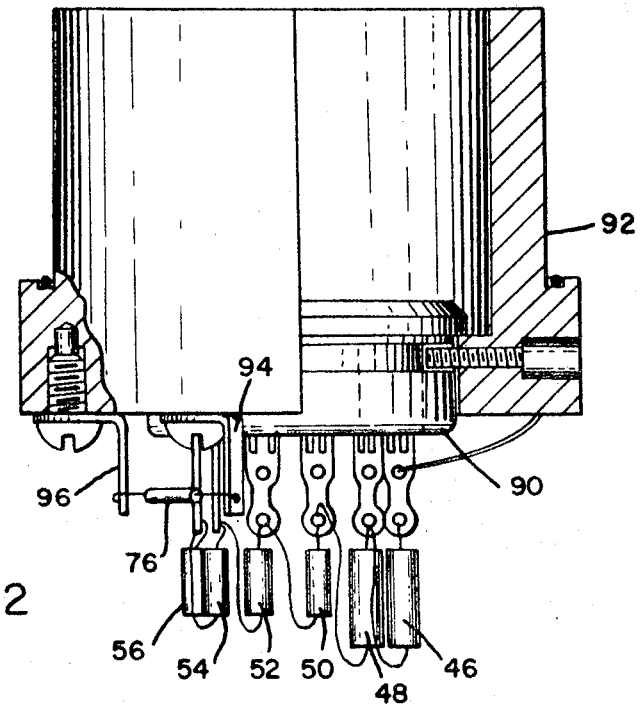
FIGURE 2 is a partial cross-sectional view of a photomultiplier tube base including the temperature sensitive element of FIGURE 1.
Figure 3:
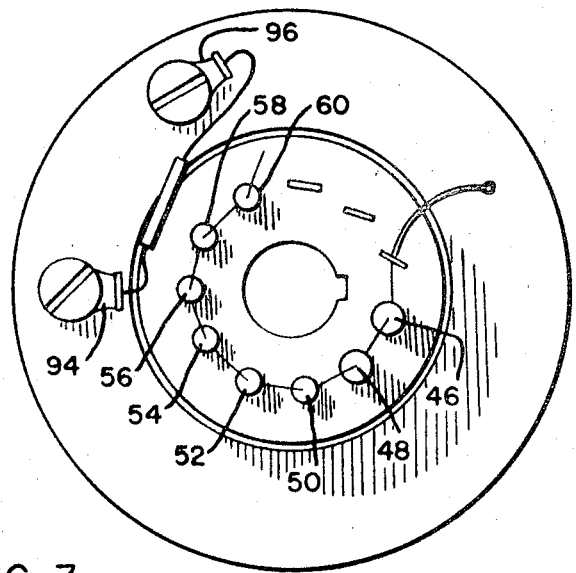
FIGURE 3 is a bottom view of FIGURE 2.

As previously mentioned, it has been found that the temperature in the vicinity of the photomultiplier tube pins provides an excellent measurement of the temperature at which the photomultiplier tube is operating. Hence, the temperature sensitive element 76 should be positioned close to the photomultiplier tube pins (as illustrated in FIGURES 2 and 3) to develop an electrical signal in the bridge circuit to compensate for variations in the photomultiplier tube sensitivity due to changes in its operating temperature. It is to be understood, however, that the temperature sensitive element 76 may be placed in other convenient positions (other than adjacent the tube pins) to sense the operating temperatures of the photomultiplier tube but with reduced sensitivity.

In FIGURES 2 and 3 a photomultiplier tube socket 90 is suitably mounted on an insulating base 92 for receiving the photomultiplier tube and providing electrical connections to the tube elements. The resistors of the voltage divider circuit of FIGURE 1 are mounted about the terminals of the socket 90. The thermistor 76 is mounted between two lugs 94 and 96 fastened to the base 92. In this particular location the thermistor 76 monitors the operating temperatures of the photomultiplier tube and generates a corresponding electrical signal. It is to be understood that FIGURES 2 and 3 are merely an illustration of how the thermistor can be mounted adjacent to the photomultiplier tube pins and that the thermistor 76 can be mounted in a different manner and in other temperature sensitive locations about the base and still provide an excellent indication of the operating temperature of the photomultiplier tube. It is believed that the metal leads connecting the various tube electrodes to the tube pins provide a low impedance thermal path for heat conduction and therefore a good indication of the temperature within the tube.

The temperature compensating bridge circuit is adjusted to match the particular characteristics of the connected photomultiplier tube in a simple two-step procedure. The photomultiplier tube is inserted into the socket 90 and a reference beam of radiation having predetermined intensity is applied thereto. The magnitude of the power supply voltage applied to the terminal 44 is adjusted to produce the desired photomultiplier tube sensitivity. The bridge circuit is now balanced by the setting of the wiper of the potentiometer 82 at point D, and measuring the voltage developed across the resistor 66. The wiper of the potentiometer 82 is subsequently moved to point C and the wiper of the potentiometer 78 is adjusted until the output voltage across the resistor 66 is restored to the prior measured value.

The equipment is subsequently allowed to warmup to its normal operating temperature at a given ambient temperature. Once up to normal operating temperature and with the same light intensity applied to the tube, the movable arm of the potentiometer 82 adjusted to reset the prior measured voltage level across the resistor 66. It should be noted that the potentiometer 78 is not adjusted after warm-up.

The potentiometers 78 and 82 tailor the characteristics of the temperature compensating bridge circuit to match the sensitivity vs. temperature characteristic of the connected photomultiplier tube. It can be assumed that the sensitivity of the photomultiplier tube decreases with temperature as illustrated by the curve 95 of FIGURE 5. The bridge circuit is adjusted to change the dynode potential as of function of temperatures (curve 97) to increase the sensitivity of the photomultiplier tube by a corresponding amount to produce the temperature stable operation as illustrated by the dashed curve 99. Accordingly, the temperature compensating circuit is now matched to the connected photomultiplier to stabilize its operation over the usual range of operating temperatures. The adjustment procedure only includes two steps, the first when the tube is initially energized and the second after a warm-up period. No further adjustments are generally required.

Figure 4:
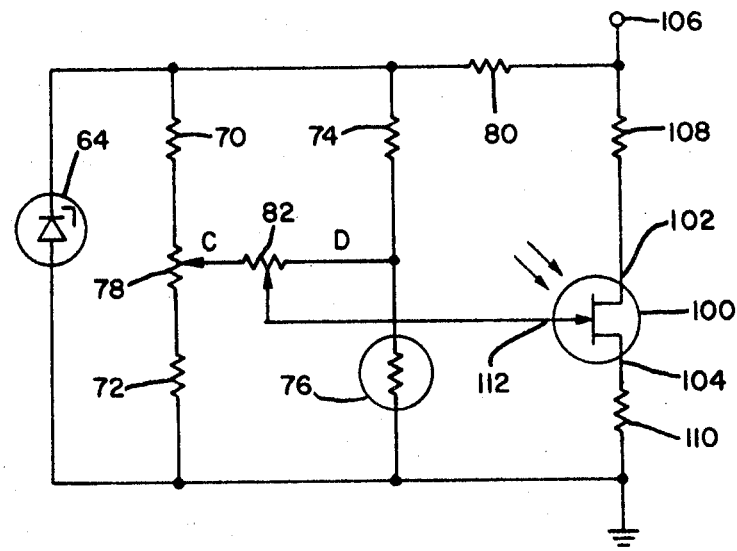
FIGURE 4 is a schematic diagram of a photoelectric field-effect transistor circuit connected to the temperature compensating circuit of FIGURE 1.

In FIGURE 4, the temperature compensating bridge circuit is connected to stabilize the sensitivity of a photoelectric field-effect transistor 100. For purposes of simplification the same elements in the temperature compensating circuit of FIGURES 1 and 4 are designated by the same reference numerals.

The source and drain electrode 102 and 104 of the field-effect transistor 100 are connected in between a power supply terminal 106 and ground through a pair of resistors 108 and 110. A gate electrode 112 is connected to the wiper of the potentiometer 82. The resistor 80 is connected between the bridge circuit and the power supply terminal 106 to apply the energizing potential thereto. The temperature compensating element 76 can be suitably located adjacent the photoelectric field-effect transistor 110 or physically connected thereto to sense the operating temperature of the device.

The temperature compensating action of the bridge circuit effectively functions as set forth with regards to FIGURE 1. The bridge circuit is adjusted to match its temperature compensating action to the characteristics of the photoelectric field-effect transistor in the manner previously set forth with regards to FIGURE 1. The measurements of the sensitivity field-effect transistor 100 can be made by measuring the voltage at either the drain or source electrodes.

Either positive or negative temperature coefficient thermistors can be utilized as the temperature sensitive element 76 of the bridge circuit. The circuits of FIGURES 1 and 4 includes a negative coefficient thermistor wherein the resistance of the device decreases as the temperature increases. Hence, as the temperature increases, the voltage at point D becomes increasingly positive with respect to the cathode of the photomultiplier tube 20 or the drain 104 of the field-effect transistor 100. The sensitivity of the photomultiplier tube depends (among other factors) upon the potential drop between dynodes 40 and 42. The compensating network therefore functions to vary the potential at the dynode 42 without effecting the voltages on the other dynodes 26–40. The sensitivity of the photoelectric field-effect transistor is controlled by adjusting the bias between the gate and drain electrodes 112 and 104. An approximate slope of the compensation characteristic of the bridge circuit is selected by adjusting the potentiometer 82 since the maximum variation of the potential applied to the dynode 42 or gate electrode 112 occurs with the wiper of the potentiometer 82 at point D and a minimum at point C. Accordingly, any value therebetween can be selected. The temperature compensating circuit thereby provides a two-point approximation to reduce the changes in photoelectric device sensitivity due to temperature variation over the normal operating range of the equipment to a value that can be neglected and thereby provides a substantial improvement in the long term operational stability of the photoelectric circuit.

Figure 6:
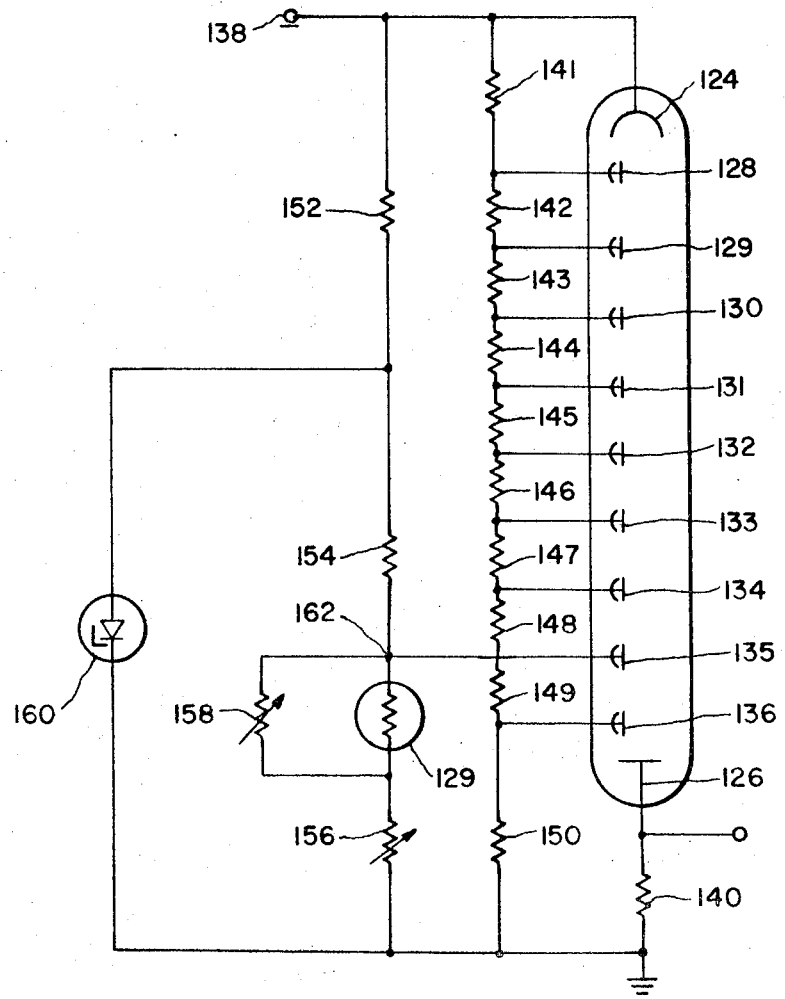
FIGURE 6 is a schematic diagram of a second embodiment of a temperature compensating circuit of the invention including a temperature sensitive element having a negative temperature coefficient.

In the embodiment of FIGURE 6, a temperature sensitive element 120 is connected in a combination series, parallel circuit (rather than the bridge circuit of FIGURES 1 and 4) to control the potential on a dynode 135 of a photomultiplier tube 122. The photomultiplier tube includes a photocathode 124, an anode 126 and a plurality of dynodes 128–136. The photocathode 124 is connected to a power supply terminal 138 while the anode 126 is connected to ground through the output resistor 140. The dynodes 128–134 and 136 are connected to successive points on a resistor voltage divider including the resistors 141–150 connected between the terminal 138 and ground.

The temperature sensitive element 120, such as a thermistor having a negative temperature coefficient, is connected in a series with the resistors 152 and 154 and the potentiometer 156 between the terminal 138 and ground and also in parallel with the potentiometer 158. A Zener diode 160 is connected between the resistors 152 and 154 and ground to provide a stabilized voltage source. The dynode 135 is connected to the junction point 162 of the temperature sensitive element 120, the resistor 154 and the potentiometer 158. It is to be understood that the temperature compensating circuit of the invention can be connected to any dynode, or group of dynodes, provided the component values are accordingly adjusted to provide the correct dynode bias voltage.

Figure 7:
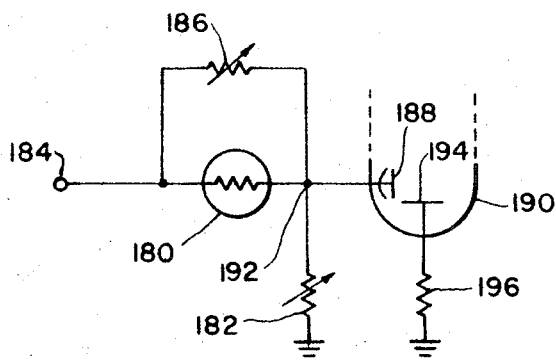
FIGURE 7 is a schematic diagram of a modification of the circuit of FIGURE 6 including a temperature sensitive element having a positive temperature coefficient.

FIGURE 7 is a modification of the circuit of FIGURE 6 including a temperature sensitive element 180 having a positive temperature coefficient. The temperature sensitive element is connected in series with a potentiometer 182 between a terminal 184 (for connection to a reference voltage source) and ground and in parallel with a potentiometer 186. The dynode 188 of a photomultiplier tube 190 is connected to the junction point 192. The anode 194 is connected to ground through a resistor 196.

Figure 5:
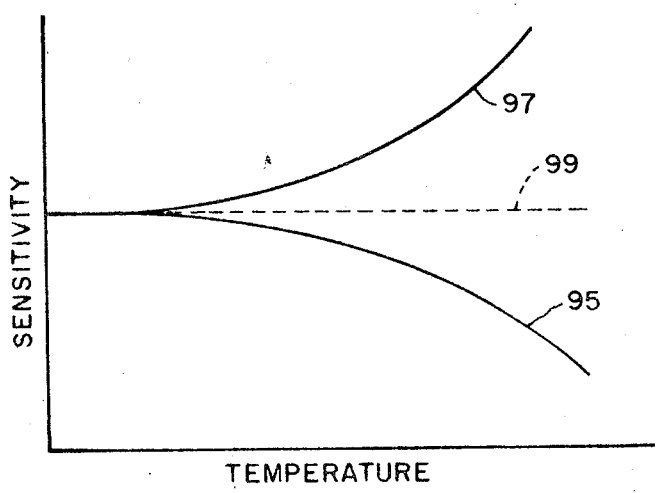
FIGURE 5 is a graphic representation of the changes in photomultiplier sensitivity and temperature compensating action of the circuit of the invention plotted as a function of temperature.

In FIGURES 6 and 7 the potentiometer 156 and 182 control the magnitude of the voltage developed at the points 162 and 192 respectively while the potentiometer 158 and 186 control the slope of the curve 97 (FIGURE 5). The temperature compensating circuits of FIGURES 6 and 7 are adjusted to effectively match the temperature characteristics of the photomultiplier tube. When the photomultiplier tube is initially turned on and a known amount of radiation is applied thereto, the potentiometers 156 and 182 are initially adjusted to provide the desired voltage drop across the resistors 140 and 196 respectively. After a sufficient warm-up period the potentiometers 158 and 186 are subsequently adjusted to develop the same voltage drop across the resistors 140 and 196. The photomultiplier tube is now cut off and allowed to cool. After a sufficient cooling period the tube is turned on again and the potentiometers 156 and 182 are re-adjusted (if necessary) to provide same voltage drop across the resistors 140 and 196. The photomultiplier tube is again allowed to warm up and the potentiometers 158 and 186 are readjusted (if necessary) to provide the voltage drop. This procedure is repeated a number of times until the temperature compensating circuit is adjusted to track and compensate for the temperature variations in the photomultiplier tube.

Figure 8:
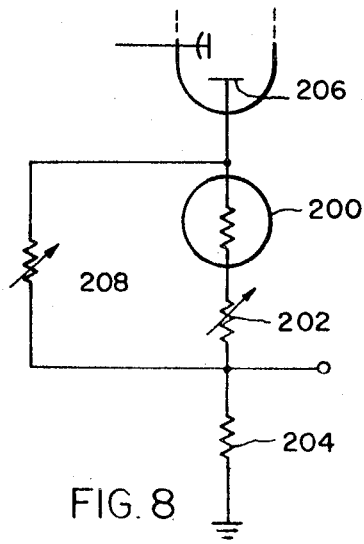
FIGURE 8 is a schematic diagram of a third embodiment of a temperature compensating circuit of the invention including a temperature sensitive element having a negative tempertaure coefficient and is coupled to the anode electrode of a photomultiplier tube.

In the embodiment of FIGURES 8–11 the temperature compensating circuits are connected to temperature compensate the potential developed at the photomultiplier tube anode electrode. In FIGURE 8 a temperature sensitive element 200 (having a negative temperature coefficient) is connected in series with a potentiometer 202 and a resistor 204 between the anode 206 and ground. A second potentiometer 208 is connected in parallel with the series circuit including the temperature sensitive element 200 and the potentiometer 202.

Figure 9:
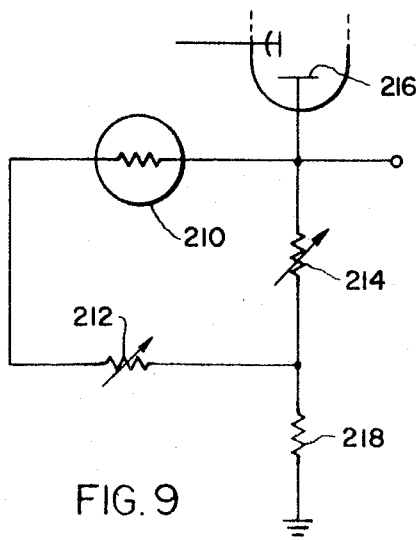
FIGURE 9 is a schematic diagram of a modification of the circuit of FIGURE 8, including a temperature sensitive element having a positive temperature coefficient.

In FIGURE 9 the temperature sensitive element 210 (having a positive temperature coefficient) is connected in series circuit with a potentiometer 212. The series circuit is connected in parallel with a potentiometer 214. The potentiometer 214 is connected at one end to the anode 216 and through a resistor 218 to ground.

The potentiometers 208 and 214 are adjusted when the photomultiplier tube is initially turned (with a known amount of radiation applied thereto) on to provide the desired operating potential at the anode. The poteniometers 208 and 212 are adjusted after the tube has warmed up. The procedure is repeated as previously set forth with regards to FIGURES 6 and 7 to match the operation of the circuit to that of the connected tube.

Figure 10:
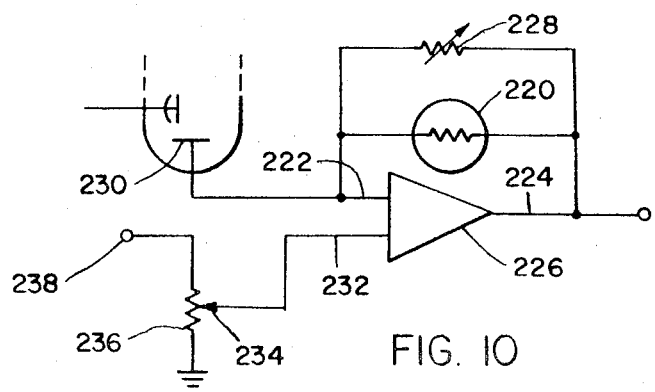
FIGURE 10 is a fourth embodiment of a temperature compensating circuit of the invention including an amplifier circuit connected to a temperature sensitive element having a negative temperature coefficient.
Figure 11:
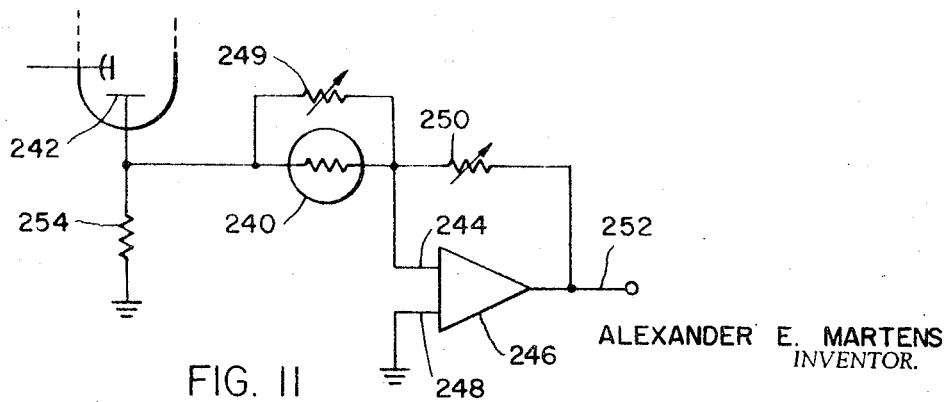
FIGURE 11 is a modification of the schematic diagram of FIGURE 10 including a temperature sensitive element having a positive temperature coefficient.

In the embodiments of FIGURES 10 and 11, the temperature compensating circuit include direct current differential amplifiers. In FIGURE 10 the temperature sensitive element 220 (having a negative temperature coefficient) is connected in a feedback path between an input circuit 222 and an output circuit 224 of a direct current amplifier 226. A potentiometer 228 is connected in parallel with the temperature sensitive element 220. The input circuit 222 is also connected to the anode electrode 230 of a photomultiplier tube. The other input circuit 232 of the amplifier 226 is connected to a movable arm 234 of a potentiometer 236. The potentiometer 236 is connected between a terminal 238 (adapted to be connected to a source of reference potential) and ground.

In FIGURE 11 a temperature sensitive element 240 (having a positive temperature coefficient) is connected between the anode electrode 242 and an input circuit 244 of a direct circuit differential amplifier 246. The other input circuit 248 is connected to ground. A potentiometer 249 is connected in parallel with the temperature sensitive element. A potentiometer 250 is connected in a feedback path between the input circuit 244 and the amplifier output circuit 252. A load resistor 254 is connected between the anode 242 and ground.

The potentiometers in FIGURES 10 and 11 are adjusted in a manner similar to that set forth with regards to FIGURES 6 and 7. The potentiometers 236 and 250 are adjusted to set the voltage developed at the output circuits 224 and 252 respectively when the photomultiplier tube is first turned on. The potentiometers 222 and 249 are adjusted after a subsequent warm-up period to produce the same voltage. The adjustment procedure is repeated as often as required following the previous procedure as set forth with regards to FIGURES 6 and 7.

In each of the embodiments of the figures the temperature sensitive element monitors the operating temperature of the photoelectric device. The temperature sensitive element is located at a point to best monitor the temperature of operation of the photoelectric device, such as for example, along the base of the tube socket and adjacent the pins, or receptacles for receiving the pins. The bridge circuit of FIGURES 1 and 4 have the advantage of being adjusted by a single two step procedure. The circuits of FIGURES 6–11 may require a repetitive procedure to provide optimum operation.

What is claimed is:

1. A temperature compensating circuit for a radiation sensitive device including an emitting element for generating an electric current in response to radiation applied thereto, a collecting element for receiving said electric current and at least one control element for controlling the current flow, with electrodes coupled to said emitting, collecting and control elements, said circuit comprising:
   connection means for making electrical connections to said electrodes;
   a temperature sensitive element mounted near said connection means for monitoring the operating temperature of said radiation sensitive device;
   variable impedance means;
   first circuit means connecting said variable impedance means and said temperature sensitive element for generating a temperature responsive control signal that is a function of the impedance value of said variable impedance means; and
   second circuit means for coupling said first circuit means to one of said electrodes to temperature stabilize the operation of said radiation sensitive device.

2. A temperature compensating circuit as defined in claim 1 wherein:
   said radiation sensitive device comprises a photomultiplier tube including a photocathode, an anode and a plurality of dynodes corresponding to said emitting, collecting and control elements with pins connected to said elements;
   said connection means comprise a tube socket including terminals for making connections to said pins;
   said temperature sensitive element is mounted near at least one of said terminals.

3. A temperature compensating circuit as defined in claim 2 wherein:
   said second circuit means couples said first circuit means to a dynode of said photomultiplier tube.

4. A temperature compensating circuit as defined in claim 2 wherein:
   said second circuit means couples said first circuit means to the anode of said photomultiplier tube.

5. A temperature compensating circuit as defined in claim 1:
   wherein said variable impedance means includes two variable resistance means, and
   wherein said first circuit means connects said two variable resistance means to said temperature sensitive element for generating a control signal that is a function of the resistance values of said two variable resistance means.

6. A temperature compensating circuit as defined in claim 5 wherein:
   said connection means comprises a tube socket including a plurality of terminals for making connection with said tube pins, and
   said temperature sensitive element is mounted adjacent said tube socket terminals.

7. A temperature compensating circuit as defined in claim 6 wherein:
   said first variable resistance means is connected in a series circuit with said temperature sensitive element, and
   said second variable impedance means is connected in a parallel circuit with said temperature sensitive element.

8. A temperature compensating circuit for a photomultiplier tube circuit comprising:
   connection means for making connections to the pins of said photomultiplier tube;
   a temperature sensitive element mounted near said connection means so that said temperature sensitive element senses the operating temperature of said photomultiplier tube;
   first and second variable resistance means;
   circuit means connecting said first and second variable resistance means to said temperature sensitive element for generating a temperature responsive control signal that is a function of the resistance values of said first and second variable resistance means, and
   circuit means for coupling said control signal to at least one dynode of said photomultiplier tube.

9. A temperature compensating circuit for a photomultiplier tube circuit comprising:
   means for making connections to the pins of said photomultiplier tube;
   a temperature sensitive element mounted adjacent said means so that said temperature sensitive means senses the operating temperature of said photomultiplier tube;
   first variable impedance means connected in shunt with said temperature sensitive element;
   second variable impedance means connected in series with said temperature sensitive circuit;
   circuit means for applying an energizing potential to the circuit including said first and second variable impedance and said temperature sensitive element; and
   circuit means connecting said temperature sensitive element to an electrode of said photomultiplier tube for applying an electrical signal for stabilizing the operation of said photomultiplier tube with changes in temperature.

10. A temperature compensated photoelectric circuit comprising:
    a photomultiplier tube including a photocathode, an anode, a plurality of dynodes and electrodes for making electrical connections thereto;
    first and second terminals for connection to a source of energizing potential;
    first circuit means connecting said first terminal to the photocathode electrode;
    a voltage divider connected between said first and second terminals and the dynode electrodes;
    a temperature sensitive element mounted adjacent said photomultiplier tube electrodes;
    variable impedance means; and
    second circuit means connecting said variable impedance means and said temperature sensitive element between the anode electrode and said second terminal so that the potential developed at the anode electrode is substantially constant with variations in temperature.

11. A temperature compensated photoelectric circuit as defined in claim 10 wherein:
    said variable impedance means includes two variable resistance means; and
    said second circuit means connects one of said variable resistance means in a series circuit with said temperature sensitive element and the other one of said variable resistance means in a parallel circuit with said temperature sensitive element.

12. A temperature compensating circuit as defined in claim 10 wherein:
    said variable impedance means includes two variable resistance means; and
    said second circuit means includes an amplifier having an input circuit coupled to said anode electrode with said temperature sensitive element and one of said variable resistance means connected in a feedback circuit about said amplifier and said other variable resistance means applying a reference signal to said amplifier input circuit.

13. A temperature compensating circuit as defined in claim 10 wherein:
    said variable impedance means includes two variable resistance means; and said second circuit means includes an amplifier with said temperature sensitive element and one of said variable resistance means are coupled between said anode electrode and an amplifier input circuit, and said other variable resistance means is connected in a feedback path about said amplifier.

14. A temperature compensating circuit for a photomultiplier tube circuit including a tube socket having receptacles receiving and making electrical connection to the tube pins, said temperature compensating circuit comprises:

temperature responsive resistance means mounted so that said temperature responsive means varies its resistance as a function of the operating temperature of said photomultiplier tube;

first and second variable resistors;

first circuit means connecting said first variable resistor in a parallel circuit with said temperature responsive resistance means;

second circuit means connecting said second variable resistors in a series circuit with said temperature responsive resistance means; and third circuit means coupling said first and second circuit means to said photomultiplier tube circuit so that said first and second variable resistors are adjustable to match the compensating circuit to the variations in photomultiplier tube sensitivity with temperature to maintain the anode current substantially constant with change in temperature.

References Cited

UNITED STATES PATENTS

| | | | |
|---|---|---|---|
| 2,653,247 | 9/1953 | Lundahl | 250—207 X |
| 3,171,032 | 2/1965 | Holt | 250—207 |
| 3,184,597 | 5/1965 | Scherbatskoy | 250—207 X |
| 3,218,560 | 11/1965 | Scherbatskoy | 250—207 X |

JAMES W. LAWRENCE, Primary Examiner

C. R. CAMPBELL, Assistant Examiner

U.S. Cl. X.R.

250—210; 307—311